(12) United States Patent
Monsen et al.

(10) Patent No.: US 6,606,628 B1
(45) Date of Patent: Aug. 12, 2003

(54) FILE SYSTEM FOR NONVOLATILE MEMORY

(75) Inventors: Robert Charles Monsen, Castro Valley, CA (US); Sudhakar Mamillaplli, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/503,588

(22) Filed: Feb. 14, 2000

(51) Int. Cl.[7] .......................... G06F 12/00; G06F 17/30
(52) U.S. Cl. ..................... 707/100; 707/200; 707/205
(58) Field of Search .................. 707/100–104.1, 707/200–205; 711/100, 101, 147–156, 170–173

(56) References Cited

U.S. PATENT DOCUMENTS

| | | | |
|---|---|---|---|
| 4,424,565 A | | 1/1984 | Larson ........................ 364/200 |
| 5,247,516 A | | 9/1993 | Bernstein et al. ............. 370/82 |
| 5,260,933 A | | 11/1993 | Rouse .......................... 370/14 |
| 5,394,394 A | | 2/1995 | Crowther et al. ............. 370/60 |
| 5,463,754 A | | 10/1995 | Beausoleil et al. ..... 395/200.08 |
| 5,473,607 A | | 12/1995 | Hausman et al. ......... 370/85.13 |
| 5,485,595 A | * | 1/1996 | Assar et al. ................. 711/103 |
| 5,598,581 A | | 1/1997 | Daines et al. ............... 395/872 |
| 5,619,691 A | | 4/1997 | Katada et al. .............. 395/620 |
| 5,721,828 A | | 2/1998 | Frisch .................... 395/200.47 |
| 5,727,206 A | | 3/1998 | Fish et al. ................... 395/618 |
| 5,740,171 A | | 4/1998 | Mazzola et al. ............. 370/392 |
| 5,778,365 A | | 7/1998 | Nishiyama ...................... 707/9 |
| 5,816,301 A | * | 10/1998 | Stager ......................... 144/228 |
| 5,835,036 A | | 11/1998 | Takefman ...................... 341/95 |
| 5,838,614 A | * | 11/1998 | Estakhri et al. ......... 365/185.11 |
| 5,907,856 A | * | 5/1999 | Estakhri et al. ............. 711/103 |
| 5,924,113 A | * | 7/1999 | Estakhri et al. ............. 711/103 |
| 5,930,815 A | * | 7/1999 | Estakhri et al. ............. 711/103 |
| 6,021,415 A | | 2/2000 | Cannon et al. ............. 707/206 |
| 6,034,897 A | * | 3/2000 | Estakhri et al. ......... 365/185.33 |
| 6,122,716 A | | 9/2000 | Combs ........................ 711/163 |
| 6,128,695 A | * | 10/2000 | Estakhri et al. ............. 711/103 |
| 6,134,151 A | * | 10/2000 | Estakhri et al. ......... 365/185.33 |
| 6,141,249 A | * | 10/2000 | Estakhri et al. ......... 365/185.11 |
| 6,243,081 B1 | * | 6/2001 | Goris et al. ................. 345/555 |
| 6,292,868 B1 | * | 9/2001 | Norman ...................... 711/103 |
| 6,493,804 B1 | * | 12/2002 | Soltis et al. ................. 711/152 |

OTHER PUBLICATIONS

R.C. Farrow et al, "Mark Detection for alignment and registration in high throughput projection electron lithography Tool", AT&T Bell Laboratories , Aug. 3, 1992, pp. 2780–2783. ©1992 American Vacuum Society.

Tsuchiya, Paul F., "A Search Algorithm for Table Entries with Non–contiguous Wildcarding", printed from tsuchiya@thumper.bellcore.com., Jun. 20, 1994, pp. 1–7.

Reginald C. Farrow et al, "Alignment Mark Detection In CMOS Materials with SCALPEL E–Beam Lithography", Bell Laboratories, Lucent Technologies, pp. 2–11.

* cited by examiner

*Primary Examiner*—Greta Robinson
*Assistant Examiner*—Linh Black
(74) *Attorney, Agent, or Firm*—Thelen Reid & Priest LLP; David B. Ritchie (57) ABSTRACT

A file system for nonvolatile memory media is disclosed, based on the assumptions that the file system structure is flat (i.e., does not contain directories), and that a relatively small amount of memory space is available. The nonvolatile memory medium is divided into logical blocks of predetermined size, depending on the typical file size expected for each particular implementation. Each of these logical blocks includes a header describing the contents of the block. For example, the block header may comprise a magic number indicating whether the block is a valid file system block or a free block, the name of the file to which the current block belongs, a flag indicating whether the current block is the first or last block of the file, the block number of the next block of the current file, if any, and the length of valid data in the present block.

12 Claims, 2 Drawing Sheets

FILE SYSTEM FOR NONVOLATILE MEMORY

BACKGROUND OF THE INVENTION

1. Field of the Invention

The present invention relates in general to memory devices, and more particularly file systems suitable for use with nonvolatile memories.

2. The Background Art

As is known to those skilled in the art, numerous file system implementations have been developed. Most file systems known in the art have been developed with the assumption that the files would be stored on a magnetic disk or—in the case of data networking implementations—on a magnetic disk attached to a network file server ("NFS"). Typically, files are divided into data blocks, and these blocks are laid out on the disk in which the files are to be stored. The layout of the blocks on the disk is typically optimized for minimizing the access time for file blocks stored on these disks. These file systems are normally very large, and hence very efficient file searching strategies have been developed.

Most file systems known in the art assume that a complex directory structure will be imposed on the files, and hence complex data structures have typically been required to handle them. However, other file systems known to those skilled in the art store files in a contiguous fashion. For example, on some types of nonvolatile memory, such as flash memory media, files are typically stored in a contiguous fashion on the flash card containing the flash memory. In such a flash memory medium, there is typically no concept of "file blocks" involved. As known to those skilled in the art, however, flash media has its own peculiarities. For example, flash media typically must be reformatted to regain lost space.

Nonvolatile (sometimes written as "non-volatile") random access memory ("nvram," or "NVRAM") is typically a form of static RAM whose contents are saved when a computer is turned off or loses its external power source. As is known to those skilled in the art, nvram may be implemented in various ways, including by providing static RAM with backup battery power, or by saving its contents and restoring them from an Electrically Erasable Programmable Read Only Memory ("EEPROM").

The development of nvram enabled files to be stored in a system in a persistent way. However, existing file systems are inadequate for addressing the unique set of challenges presented by the nvram memory storage media. First and foremost, the nvram media is relatively small in terms of memory capacity (typically ranging from a few hundred kilobytes to a few megabytes). Thus, only a relatively small number of files can be stored on the media. Secondly, nvram can be accessed relatively quickly, in comparison to magnetic disks, and hence disk block layout is not a major factor that affects the seek time parameter. Also, no directory structure is typically imposed on the nvram medium.

Moreover, because critical system data is often stored in nvram (e.g., cryptographic keys, system start-up configuration files, or other types of secure files), an nvram file system must be reliable. Specifically, a system "crash" should not corrupt the file system. In order to deal with these problems, a simple but elegant file system storage for the nvram medium is disclosed herein. It provides all the necessary functionality without being burdened by unnecessary details and restrictions imposed by a traditional file system. The main assumptions of the file system design according to embodiments of the present invention are that (1) the file system structure is flat (i.e., does not contain directories), and (2) a relatively small amount of memory space is available. Also, an important design goal is not to have excessive file system information in the nvram memory medium at any given time. Most of the information is kept on the nvram, and based on this, other information may be obtained. Thus, a system crash will not result in loss of vital information which might have been buffered in memory. These and other features and advantages of the present invention will be presented in more detail in the following specification of the invention and in the associated figures.

SUMMARY OF THE INVENTION

A file system for nonvolatile memory media is disclosed, based on the assumptions that the file system structure is flat (i.e., does not contain directories), and that a relatively small amount of memory space is available. The nonvolatile memory medium is divided into logical blocks of predetermined size, depending on the typical file size expected for each particular implementation. Each of these logical blocks includes a header describing the contents of the block. For example, the block header may comprise a magic number indicating whether the block is a valid file system block or a free block, the name of the file to which the current block belongs, a flag indicating whether the current block is the first or last block of the file, the block number of the next block of the current file, if any, and the length of valid data in the present block.

DETAILED DESCRIPTION

Those of ordinary skill in the art will realize that the following description of the present invention is illustrative only and not in any way limiting. Other embodiments of the invention will readily suggest themselves to such skilled persons, having the benefit of the present disclosure.

Figure 1:
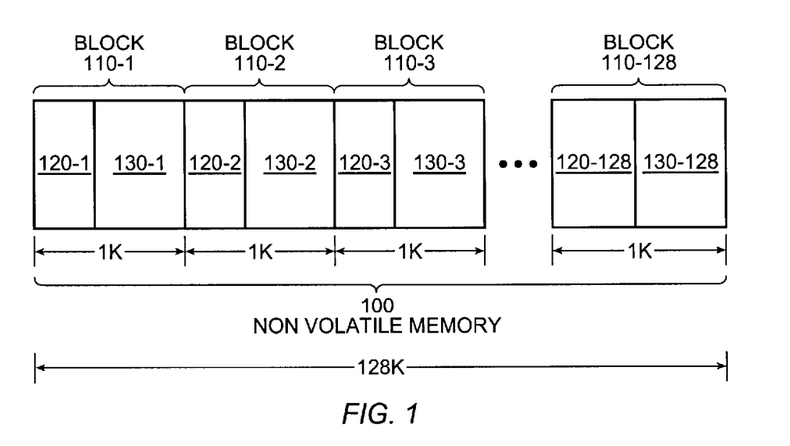
FIG. 1 is a block diagram illustrating a nonvolatile memory medium logically partitioned into memory blocks according to aspects of the present invention.

FIG. 1 is a block diagram illustrating a nonvolatile memory medium logically partitioned into memory blocks according to aspects of the present invention. As shown in FIG. 1, in one embodiment, a 128 Kbyte nvram medium 100 is logically divided into 128 1-Kbyte blocks 110-1–110-128. Each 1 Kbyte block 110-N comprises a block header portion 120-N and a data portion 130-N. Throughout this document, like elements will be referenced using the same label.

Figure 2:
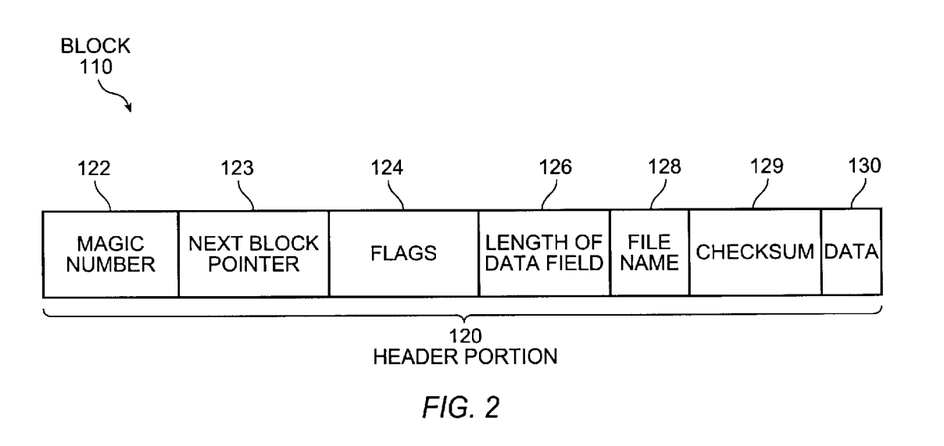
FIG. 2 is a block diagram illustrating the structure of a memory block according to aspects of the present invention.

FIG. 2 is a block diagram illustrating the structure of an exemplary memory block 110-N according to aspects of the present invention. As shown in FIG. 2, each memory block 110 comprises a header portion 120 and a data portion 130. In one embodiment, the header portion 120 comprises a magic number field 122, a next block pointer field 123, a flags field 124, a length of valid data field. 126, a file name field 128, and a checksum field 129.

In the context of the present invention, a "magic number" means any identifying number that can indicate whether a given block is a valid file system block. A "valid block" is a block which belongs to a file, as described below. In its simplest embodiment, a magic number is a single bit indicating whether a block is a valid file system block. Preferably, however, the magic number contains multiple bits so as to provide protection against data corruption in the memory medium. In one embodiment, the magic number is a 2-byte unique identifier that is the same for all valid blocks. In this embodiment, a block with the magic number field 122 equal to the magic number is considered to be a valid block. The specific choice of magic number is not critical, and those skilled in the art will recognize that different magic numbers of varying data width may be used depending on each particular implementation. It should be noted that the magic number should be chosen so that it is not likely to be present randomly (e.g., upon system power-up).

In one embodiment, next block pointer field 123 contains a pointer to the next block in the current file, if such a next block exists. Depending on each particular implementation, next block pointer field 123 may contain the absolute nvram medium address of the next block in the current file, the block number of the next block in the current file, or any other identifier known to those skilled in the art for pointing to the next block. As described below, in one embodiment, when a bit in the flags field 124 indicating that the current block is the last block of the current file is set, the value of next block pointer field 123 is ignored.

In one embodiment, flags field 124 contains a first bit that is set if the current block is the first block of a file, a second bit that is set if the current block is the last block of a file, and a third bit that is set if the current block belongs to a secure file. Other variations on the number or types of flag bits or encodings for various implementations will be readily apparent to those skilled in the art.

As described below, in one embodiment, the Length of Valid Data field 126 contains a value indicating the number of valid data bytes in the current block.

File name field 128 contains an alphanumeric or numerical code representing a file (if any) to which the current block belongs. According to aspects of the present invention, each "file" comprises one or more blocks, depending on the size of the blocks and the size of the file.

Checksum field 129 contains a value that may be used to test the integrity of the data in each block. Any of a number of data integrity verification techniques known to those skilled in the art may be used to determine and test the value of checksum field 129. For example, without limitation, the value of checksum field 129 may be equal to the sum of the values of all the data bytes in the block.

Data portion 130 contains a variable amount of data, ranging from zero bytes (for an empty valid block) to a number of bytes equal to the memory block size minus the memory block header size (for a valid block that is completely filled with data). For example, in one embodiment, the block size is 1 Kbyte (i.e., 1024 bytes) and the block header size is 32 bytes, which means that the data portion of each memory block can hold a maximum of 992 data bytes. The Length of Valid Data field 126 in the header portion 120 of each valid memory block 110 (i.e., each block with a magic number field 122 having a value equal to the magic number) indicates the number of valid data bytes in the current block.

As mentioned earlier, according to aspects of the present invention, a data file comprises one or more memory blocks 110 as shown in FIGS. 1 and 2. The blocks comprising a given file may be arranged in any order within the nvram medium. As discussed in more detail below, in one embodiment, the blocks comprising a given file may be read in order from the nvram medium by first scanning the nvram medium on a block-by-block basis, examining the block headers to find the first block of the file, and then following the next block pointers to find the next block in the file until the last block in the file has been found.

In one embodiment, a scan of the nvram medium is performed for a particular file name only when that particular file name is requested. When this occurs, the blocks are scanned to find all the blocks associated with the requested file. Similarly, when a free block is needed, the entire nvram medium is scanned on a block-by-block basis to determine whether each block has a valid magic number. If a block is found without a magic number, it is assumed to be a free block (i.e., a block that does not belong to any file), and is then used as the next block for a file if needed. In one embodiment, deletion of a file consists of "trashing" the magic numbers of the blocks composing the file (i.e., changing the magic number field so that it no longer contains the magic number). In this embodiment, a list of free blocks in the nvram medium is not kept, since there are a relatively small number of blocks (e.g., 128 1 Kbyte blocks in a 128 Kbyte nvram medium), and write operations to the nvram medium are not performed very frequently. Hence, a significant performance penalty is not incurred by the above approach. If so desired for a particular implementation, a list of free blocks can be maintained.

Data Structures

In one embodiment, a number of data structures are used to implement aspects of the present invention. First, a block header structure stores the same information that comprises each nvram block header 120 as shown in FIGS. 1 and 2. This structure, called the nvram_block_hdr structure, starts off with a magic number, which is used to determine if the block is a valid block or not. The magic number is followed by the number of the next block for the current file, if any. Next, the flags structure member keeps track of whether the current block is the first block or the last block associated with the current file. It also indicates whether the current block belongs to a secure file or not. Secure files can be used to store sensitive information, such as cryptographic keys. If the secure bit is set, only processes which have validated themselves with a policy manager (not described herein so as not to overcomplicate the present disclosure) can read the blocks comprising the secure file. The next structure member, "length," indicates the length of valid data in the current block. Next, the "file name" structure member is a field with a maximum data size defined by the MAX_NVRAM_FILELEN variable, and stores the file name of the current file in the ASCII format known to those skilled in the art. Finally, the block header structure ends with a checksum equal to the value of the checksum field 129 shown in FIG. 2 and described above.

The format of the block header structure is illustrated below. In one embodiment, the block header structure is arranged in the same way that as the memory block headers in the nvram medium. The memory block headers are stored on the actual nvram medium, whereas the block header structures are stored elsewhere on a system utilizing the nvram file system according to the present invention. For example, the block header structures may be stored in main memory.

```
#define NVRAM_FILE_FIRST_BLOCK      0x01
#define NVRAM_FILE_LAST_BLOCK       0x02
#define NVRAM_FILE_SECURE_BLOCK     0x04
typedef struct nvram_block_hdr_type {
    ushort magic_number;
    ushort next_block;
    ushort flags;              /* a bit-wise OR of the flags
                                  defined above */
    ushort length;
    char file_name[ MAX_NVRAM_FILELEN ] ;
    ushort checksum;
} nvram_block_hdr;
```

For each open file, there is an associated file information structure, as defined below. The first member of this structure indicates the first block for the specified file, the second member indicates the current block being accessed, and the third member provides an offset within this current block. In one embodiment, the "flags" structure member is used to keep track of whether the file is a secure file or not, and whether a client is authorized to access this file. If the file is a secure file, the process must be validated before the file can be accessed, and when the process is validated, the flag indicating that the client can access the file is set. Finally, the "delete on close" flag indicates whether to delete the file when it is closed. As is known to those skilled in the art, this feature is useful for secure files.

```
#define NVRAM_FILE_SECURE           0x01
#define NVRAM_FILE_ACCESS           0x02
#define NVRAM_FILE_DELETE_ON_CLOSE  0x04
typedef struct nvram_file_info_type {
    int first_block;          /* # of 1st block for this file */
    int curr_block;           /* # of current block */
    int offset_in_curr_block; /* offset relative to curr block */
    char flags;               /* bitwise OR of flags defined
                                 above */
} nvram_file_info;
```

The geometry of the current nvram medium is stored in a structure defined below. In one embodiment, the first member of this "geometry" structure is the memory size of the nvram. The second structure member is the offset to the start of "useful" nvram. In some applications, an initial portion of the nvram medium may be allocated to a different file system, and therefore not usable for the purposes of the present invention. In such situations the offset structure member may be used to indicate the size of the nvram medium memory space allocated for other purposes.

Next, the third structure member is the block size for each nvram block, while the fourth member is the number of such blocks present in the current nvram medium.

The geometry structure is passed on to all format functions (described below) to enable them to handle each high-level nvram file function appropriately. The format of the geometry structure is shown below.

```
typedef struct nvram_geometry_type {
    int nv_size;    /* size of the nvram, in Kbytes */
    int nv_start;   /* the offset for "useful" nvram */
    int blocksize;  /* size of each block, in bytes */
    int no_blocks;  /* number of blocks */
} nvram_geometry;
```

NVRAM File System Manager

Figure 3:
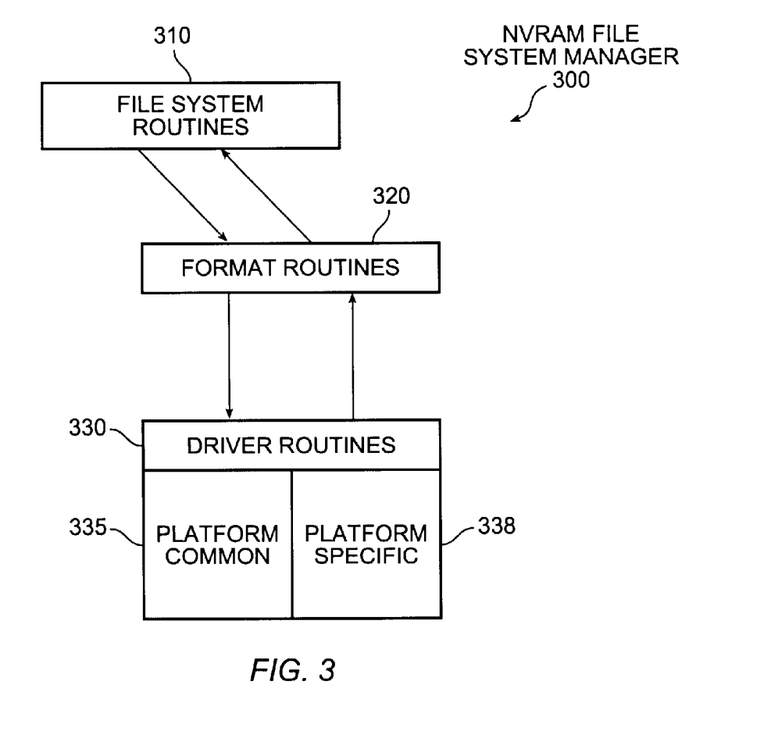
FIG. 3 is a block diagram illustrating the software structure of an nvram file system manager according to embodiments of the present invention.

To provide for seamless implementation of nvram file systems according to aspects of the present invention in a variety of hardware platforms, a common set of software functions (known as the "nvram file system manager") may be provided. FIG. 3 is a block diagram illustrating the software structure of an nvram file system manager 300 according to one embodiment of the present invention. As shown in FIG. 3, file system routines 310 are at the highest level of abstraction, and may be implemented as a function library. In one embodiment, file system routines 310 comprise the following functions: io_open( ) (for opening a file), io_read( ) (for reading data from a file), io_write( ) (for writing data to a file), io_close( ) (for closing a file), io_unlink( ) (for removing files), io_lseek( ) (for moving the read/write file pointer), io_stat( ) (for providing information on files), and init( ) (for initializing the file system). As is known to those skilled in the art, file system routines 310 may be grouped into or implemented as an Application Program Interface ("API") , static library, dynamic link library ("DLL") , or any of a number of other devices known in the literature.

Still referring to FIG. 3, file system routines 310 call the format routines 320 to implement the sub-tasks necessary to execute each file system routine 310. In one embodiment, format routines 320 comprise the following functions: find_file_by_name( ) (to find a specified file in the nvram medium, if it exists), read_nvram( ) (to read data from the nvram medium), write_nvram( ) (to write data to the nvram medium), set_offset( ) (to set the current block and offset members of the nvram_file_info structure), create_file( ) (to create a new file), geometry_init( ) (to initialize the nvram file system), erase_file( ) (to erase all the blocks comprising a specified file), get_list_of_files( ) (for providing a directory of files in the nvram medium), close_file( ) (for closing a file), and get_filename( ) (for returning the filename to which a specified block belongs. In one embodiment, the format routines 320 are aware of the layout (or "geometry") of the nvram (e.g., the start address of the nvram, the block size, number of blocks, etc.). This information is used to determine the amount of data to transfer, and from which block or blocks.

In turn, format routines 320 invoke d river routines 330 to implement the most elemental subtasks necessary to execute the file system routines 310 and to actually interface with the nvram medium. In one embodiment, driver routines 330 are further subdivided into platform independent routines 335 and platform specific routines 338. Platform independent routines 335 are elementary functions that are common to a wide variety of hardware platforms. In one embodiment, these functions comprise read_stuff( ) (for reading data from the nvram medium), write_stuff( ) (for writing data to the nvram medium), and get_nvsize( ) (to determine the memory size of the nvram medium).

Platform specific routines 338 are those elementary functions whose details differ depending on the specific hardware characteristics of each implementation. Typically, a new set of platform specific routines 338 must be developed depending on the hardware configuration of each implementation. In one embodiment, the platform specific routines include nv_getptr( ) (for returning a pointer to the base address of nonvolatile memory), nv_done( ) (for handling the writing of data to the nvram medium), nv_writeenable( ) (to enable further writes to the nvram medium), nv_writedisable( ) (to disable further writes to the nvram medium), nv_init( ) (to initialize the nvram medium), and nv_badptr( ) (to handle a bad block pointer). As is known to those skilled in the art, the platform specific routines 338 may be implemented as Dynamic Link Libraries ("DLLs") which are loaded onto a particular system depending on the hardware platform used in each implementation.

Using the above or an equivalent set of functions, embodiments of the present invention provide the required functionality to implement a functional nvram file system manager. Each of the functions in the three function groups listed above is described in detail in the sections that follow. Additional implementation details which are well within the routine programming skill of those skilled the art have are not discussed herein, so as not to overcomplicate the present disclosure.

File System Functions

The file system functions are the high-level functions invoked to perform normal file-oriented tasks such as open, read, write, erase, etc. Each of these file system function is described more fully below.

io_open( )

Open on an existing file involves searching for the block defining the first block of the file. Once the first block is known, the entire file can be accessed by following the "next block pointers" stored in the header. Hence, in one embodiment, when an open call is given, the nvram is scanned in sizes of one block. The block header is read in, and the magic number is tested. A valid magic number indicates a valid block, while an invalid magic number indicates a free block. If the block is a valid block, the file name is compared to the file being opened, and if it matches, the flag indicating if the current block is the first file block associated with this file is tested. If it is not the first block, the scan is continued until either the first block of the specified file is encountered or an error condition occurs.

Open on a nonexistent file involves finding a free block (which in one embodiment involves finding the first block with an invalid magic number). This free block header is then modified to write the magic number into the magic number field of the block header, the name of the file to be opened, the flags described above, and other relevant information as required by a particular implementation.

From a software standpoint, after verifying the file permissions, the high level io_open( ) function calls the find_file_by_name( ) function with the file name to be opened. If the specified file exists, an nvram_file_info structure is filled in by this function. If the open is for read, and the file does not exist, then the open fails. If the file exists and the open is for write then, the file is truncated to zero length. If the file is opened for write and the file does not exist, a new file is created if at least one free block is available.

io_read( )

Read involves reading the data in the blocks associated with the file. When a read command requests an amount of data greater than the data in the present block, the read is continued to the next block associated with this file. The lower-level read_nvram( ) function (described below) is called with a buffer, which fills in the buffer with the required data.

io_write( )

The io_write( ) function is substantially similar to io_read( ), with data being written to the current block. If the amount of data to be written is greater than the amount of data that would fit into a block, and if the current block is the last block of the file, a new free block is found and attached to the end of the file, at which point the write operation continues in the newly found block. Similarly to io_read( ), the write_nvram( ) function is called, except that this time the buffer passed to the function is written into nvram as file data.

io_close( )

If the flags associated with the nvram_file_info structure (described earlier) indicate that the "delete on close" flag has been set, then the file is erased by calling the lower level erase_file( ) function. Otherwise, the nvram_file_info structures are freed and the current block is marked as the last block for this file, if this file has been opened for write.

io_seek( )

An io_seek( ) function involves traversing the list of blocks until the desired offset is reached. In one embodiment, this function is typically not used, since file operations are performed on a block by block basis. However, the io_seek( ) function may be useful in situations where block synchronization has been lost for some reason. As in previous cases, if the offset is greater than the data in the current block, a jump is made to the next block based on the next pointer stored in the header of the block. The io_seek( ) function calls the lower level set_offset( ) function.

init( )

The init( ) function calls the lower level geometry_init( ) function, which is responsible for filling in the geometry information for the current nvram medium.

io_unlink( )

The io_unlink( ) function is used to delete files. A delete involves the simple operation of traversing all the blocks comprising the specified file starting from the first block, and overwriting the magic number field in each such block with a value not equal to the magic number. The lower level erase_file( ) function is called.

io_stat( )

The io_stat( ) function is normally used to provide information concerning specified files. In one embodiment of the present invention, all the io_stat( ) parameters are set to zero except for the mode and size, which are copied from an attribute structure. In this embodiment, for the directory parameter, the size is set to 1.

Nvram Format Functions

The nvram format functions are lower-level building blocks called by the high-level file-oriented functions to implement the details of each file-oriented function. These functions are aware of the nvram format from the nvram geometry structure, and are called by the file system functions to manipulate the nvram file system. Each nvram format function according to one embodiment of the present invention is described in more detail in the following sections.

int read_nvram (nvram_file_info *file, nvram_geometry *geometry, char *buffer, int buflen)

Given the nvram_geometry and nvram_file_info structures, the read_nvram( ) function reads an amount of data equal to buflen from the specified file into a buffer, and returns the amount of data that was read. Since the nvram geometry is known, a read_nvram( ) call is converted into a series of calls for each block comprising the specified file, and the lower level read_stuff( ) function is called (described below), which is a driver function responsible for actual reading of data from the nvram.

int write_nvram(nvram_file_info *file, nvram_geometry *geometry, char *buffer, int buflen)

The write_nvram( ) function is substantially similar to the read_nvram( ) function, except that the write_stuff( ) driver function is the driver-level function which is called to ultimately write data to the nvram from the buffer. Also, if at end of the specified file, further writes result in a search for a free block which, if available, is added to the list of blocks associated with this file. The nvram_file_info structure is also updated accordingly.

int find_file_by_name (char *name, nvram_geometry *geometry, nvram_file_info *file)

Given the nvram geometry, this function scans all the blocks in the nvram medium for a specified file having a particular name, and fills in the nvram_file_info structure passed on to it when the specified file is found. It. returns the file size, if the specified file is found. If the file does not exist, the function returns (−1).

int set_offset (nvram_file_info file, int offset)

The set_offset( ) function, when passed the nvram_file_info structure and an offset into the specified file, sets the current_block and offset_in_curr_block members of the nvram_file_info structure appropriately. int create_file (nvram_geometry *geometry, nvram_file_info *file, char *filename, bool secure)

The create_file( ) function is called if a new file with name "filename" needs to be created. The create_file( ) function finds a free block, if any are available, fills in the appropriate header information, and returns. If the secure file parameter is true, then the file block created is set to be a secure block, and if the secure file parameter is not true, the file block created is set to be a non-secure block.

int geometry_init (nvram_geometry *geometry)

The geometry_init( ) function is called before the nvram driver is started. It is responsible for filling the geometry structure. It calls nv_init( ), and also uses the get_nv_size( ) function to fill in the geometry structure. All of these functions are driver-specific functions. Once the geometry is known, the geometry_init( ) function "sanitizes" the nvram. This step is needed to ensure the consistency and reliability of the nvram file system. For example, if an application accessing the nvram crashes in the middle of writing a file, the geometry_init( ) function is responsible for scanning through the nvram and removing any partial files remaining upon the next system startup. Also, it is possible that some of the file blocks may have been overwritten during a previous bootup. Therefore, once the nvram geometry is known, the geometry_init( ) function scans through all the file blocks in the nvram, deleting any partial files and ensuring that all the blocks of every file are available and that there are no dangling blocks (i.e., blocks not part of any file).

int erase_file (nvram_geometry *geometry, nvram_file_info *file)

In one embodiment, when the erase_file( ) function is called, all blocks comprising the specified file described by the nvram_file_info parameter are zeroed out.

int get_list_of_files(char *buffer nvram_geometry *geometry, int rem_size, int offset, int *size)

The get_list of_files( ) function returns a list of all the files present in the nvram. In one embodiment, the entire nvram medium is scanned on a block-by-block basis, and the file name field (encoded in ASCII) from each block header is read in for all valid blocks. In this embodiment, when duplicate file names are read in, they are assumed to be additional blocks of the same file. The complete list of file names (with duplicates deleted) is written into a buffer upon return from the get_list_of_files( ) function.

int close_file(nvram file_info *file, nvram_geometry *geometry)

The close_file( ) function is called when a file opened for write is called. The last block flag is set, and the header for the last block is written.

int get_filename(int block_no, nvram_geometry *geometry, char *filename)

Given a specified block number ("block_no") , the get_filename( ) function returns the file name to which the specified block belongs, if any.

Driver Functions

The file system and nvram format functions discussed above access the nvram medium through the nvram driver interface routines defined below. As discussed in the Interface Design section, below, a platform specific DLL, linked in when an nvram file system manager process starts, is responsible for providing a pointer to the functions below. Each driver function according to one embodiment of the present invention is described in more detail in the following sections. In many cases, implementation details are not provided herein so as not to overcomplicate the present disclosure. Such implementation details are well within the capabilities of those skilled in the art.

int read_stuff(int offset, char *buffer, int len)

Given a offset and a buffer, the read_stuff( ) function reads "len" data bytes from the nvram medium at "offset" from the beginning of the nvram medium, and writes the results to the specified buffer. The function returns the length of data read.

int write_stuff(int offset, char *buffer, int len)

The write_stuff( ) function is substantially similar to read_stuff( ), except that "len" data bytes from the specified buffer are written into the nvram medium starting at "offset," and the length of data written is returned.

int start_of_usable memory( )

This function returns an offset from the beginning of nvram, indicating the point at which nvram media allocated for other purposes or file systems ends.

int get_nv_size( )

The get_nv_size( ) function returns the size of the current nvram medium.

int nvram_init( )

In one embodiment, the nvram( ) function simply calls geometry_init( ).

bool other_filesystem_exist( )

This function either returns true or false, depending on whether other file systems exist on the current nvram medium.

void collect_platform_dependent_values (platform_values *platform_vals, nvram_platform_dll_funcs *nvram_driver_interface_routines)

This function collects all the platform dependent routines needed through this call. This is defined by the structure platform_vals. The function also fills in the addresses of platform independent routines in the nvram_driver_interface_routines structure, which is the interface through which nvram driver is accessed to the caller. This is then passed to the nvram file system manager process. This function is described in more detail in the Interface Design section, below.

nvtype *nv_getptr(void)

This function returns a pointer to the base address of the non-volatile memory.

void nv_done(nvtype *ptr)

This function handles the writing of data to the nvram memory.

void nv_writeenable(nvtype *ptr)

This function simply turns the nv_write enable flag on.

void nv_writedisable(nvtype *ptr)

This function simply turns the nv_write enable flag off.

unsigned long nv_init(unsigned long *phy_address)

This function discovers the size of the nvram and performs some initialization. The function returns the system address at which the nvram has been mapped. Also, the argument passed is filled in with the actual physical address at which the nvram has been located. This information can be used to convert physical to virtual addresses and vice versa, since in some nvram file system implementations cases the actual physical address may be important.

bool nv_badptr(nvtype *ptr)

Given a correctly checksummed portion of non-volatile memory, the nv_badptr( ) function examines the data structure components for sanity. If the configuration magic number is set, the function returns zero.

Interface Design

In one embodiment, the nvram file system provides a posix interface for using the nvram medium. However, the interface for opening and accessing secure files is typically separate, and has been discussed in the API functional description above.

Figure 4:
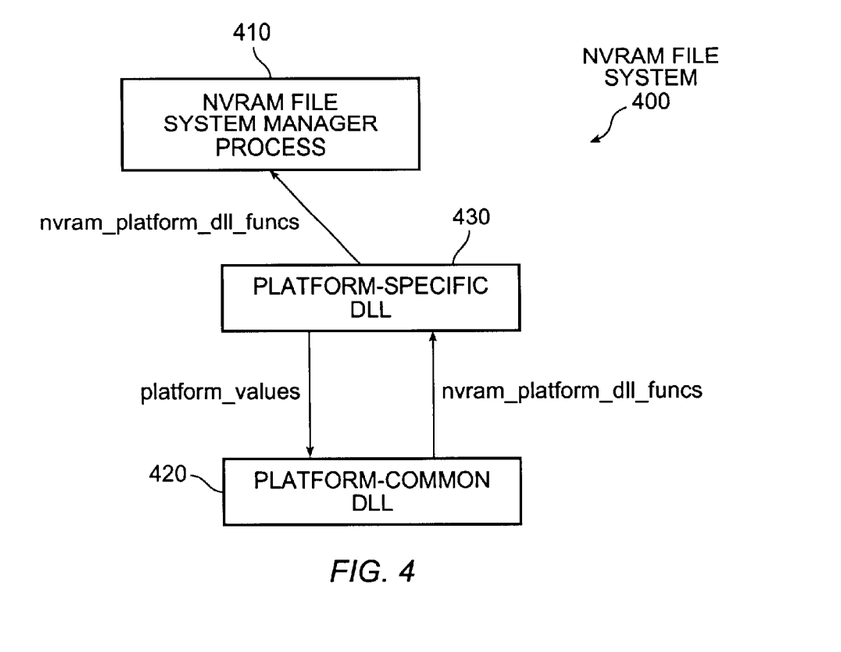
FIG. 4 is a block diagram illustrating the interaction of the software components comprising an nvram file system according to one embodiment of the present invention.

FIG. 4 is a block diagram illustrating the interaction of the software components comprising an nvram file system according to one embodiment of the present invention. As shown in FIG. 4, the nvram file system 400 comprises the nvram file system manager process 410, a platform-common DLL 420, and a platform-specific DLL 430. The nvram file system manager process 410 accesses the platform specific functions, through indirect function calls defined in the structure of type nvram_platform_dll_funcs. This structure has a number of function calls, which the process calls through this structure to gain access to the physical nvram medium. The structure with these functions must be provided by the platform-specific DLL 430.

When the nvram process 410 starts up, it opens the platform-specific DLL 430 and performs the common dlsym( ) DLL access function known to those skilled in the art on NVRAM_DLL_PLATFORM_INTERFACE_ROUTINES. This should return a pointer to a function which returns a structure of type nvram_platform_dll_funcs filled in by the platform specific DLL 430. As long the platform specific DLL provides a way for returning this function, that is all that is needed to provide a fully functional nvram file system.

In order to simplify the nvram file system creation process, the platform-common DLL 420 is also provided. In some applications, it is not necessary to use this DLL at all. However, platform-common DLL 420 defines the functions in nvram_platform_dll_funcs that were defined in the previous paragraph. In one embodiment, the platform-common DLL 420 must also deal with platform specific issues.

As shown in FIG. 4, it should be noted that the nvram file system manager process 410 accesses the nvram medium through functions defined in nvram_platform_dll_funcs, which are subsequently defined in the platform-common DLL 420. It is however, the duty of the platform-specific DLL 430 to pass the addresses of these routines to the nvram file system manager process 410. In order to accomplish this, the platform-specific DLL 430 must obtain the addresses of these routines from the platform-common DLL 420 and pass them on to the nvram file system manager process 410. Also, the platform-common DLL 420 uses platform specific routines defined in the platform-specific DLL 430. Therefore, the addresses of routines in the platform-specific DLL 430 are also needed.

Still referring to FIG. 4, to accomplish the above tasks, as soon as the nvram file system manager process 410 starts, it makes a function call to the function that had been obtained by performing dlsym( ) on NVRAM_DLL_PLATFORM_INTERFACE_ROUTINES. This function call then makes another call to a function called collect_platform_dependent_values( ) in the platform-common DLL 420 with two parameters. The first parameter is a structure of type platform_values, with all the platform-specific function pointers filled in for the receiver's (i.e., the platform-common DLL 420) use. The second parameter is a pointer to a structure of type nvram_platform_dll_funcs. When the platform-common DLL 420 receives the function call, it saves the first parameter and fills in the second parameter with the nvram interface routine function addresses. Upon return, the platform-specific DLL 430 passes the information on to the nvram file system manager process 410.

To achieve this, the platform driver must provide such a function. The details of this process are not disclosed herein, so as not to overcomplicate the present disclosure. However, providing such a function should be well within the capabilities of those skilled in the art, and requires only application of routine programming skills. The definition of the nvram_platform_dll_funcs structure and of the platform_values structure are provided below.

typedef struct nvram_platform_dll_funcs_{
int (*read_stuff) (int offset, char *buffer, int len);
int (*write_stuff) (int offset, char *buffer, int len);
int (*get_nv_size)( );
int (*classic_nv_open) (long *size, unsigned char **data);
void (*nvram_init) ( );
} nvram_platform_dll_funcs;

The above structure contains a pointer to the nvram interface routines discussed in previous sections.

typedef struct platform_values {
nvtype *(*nv_getptr) ( );
bool (*nv_badptr) (nvtype *ptr);
void (*nv_done) (nvtype *ptr);
void (*nv_writeenable) (nvtype *ptr);
void (*nv_writedisable) (nvtype *ptr);
void (*nv_init) (void);
int (*getmonvar) (unsigned char **buf);
int (*nv_size) ( );
int (*nvwriteflag)( );
} platform_values;

The pointer to functions in the above structure are same as pointers to platform specific functions needed by the platform-common DLL 420 to get the work done, along with a few variables shared with it.

Crash Recovery

If the nvram subsystem crashes, when a system utilizing an embodiment of the nvram file system according to the present invention boots up again, a "sanity check" is made to make sure that the files in the nvram are in a consistent state. The following actions are taken if an inconsistent file is found: If a loose block is found, the block is deleted. If a file is found with any missing blocks, the entire file is deleted (i.e., all the blocks containing the file name in the block header are converted to free blocks by overwriting the magic number field with a value not equal to the magic number). If multiple files exist with the same file name, the first such file is kept and the rest are deleted. If the last block of a file does not have the "last block of file" flag set but has the "next block" set to zero, then the "last block of file" flag is set.

Advantages

As those skilled in the art will recognize based on the above discussion, file operations according to embodiments of the present invention are simple and provide all the functionality required for typical nvram file system applications.

There are several advantages of embodiments of the present invention as compared to traditional file systems. First, unnecessary details associated with disk-based file systems have been eliminated, thus keeping the code simple and easy to maintain. Moreover, at any given time, the file system on the nvram is self-sufficient, such that no vital information is kept in the memory for a long enough time that a system crash would corrupt the file system due to unwritten information. Furthermore, compared to file systems where data is written contiguously, such as flash file systems, the file system design according to aspects of the present invention achieves less fragmentation and allows multiple writes simultaneously. In general, it is difficult to achieve multiple writes on a file system where data is written contiguously, since it is difficult to determine how long the files would be. Also, such a file system storage suffers from more fragmentation.

For example, if a contiguous file system had four files stored on it (e.g., files A, B, C, and D, each of size 1 Kbytes), and if files B and D have been deleted, it is not possible to coalesce the remaining free memory together to obtain a contiguous memory area of 2 Kbytes. Therefore, files greater than 1 Kbytes cannot be saved. In contrast, in the file system design proposed according to the present invention, fragmentation is limited at most by the selected block size. For a typical block size of 1 Kbytes with a 32-byte header, the amount of lost space due to the header is less than 4%. Since nvram media are typically used to store small files, this proportion of lost memory space due to headers is generally acceptable.

As is known to those skilled in the art, the program code necessary to implement the software components described herein according to aspects of the present invention may all be stored on a computer-readable medium. Depending on each particular application, computer-readable media suitable for this purpose may include, without limitation, floppy diskettes, hard drives, RAM, ROM, EEPROM, nonvolatile RAM, or flash memory. Moreover, the program code necessary to implement the software components described herein according to aspects of the present invention may be executed by any processor or combination of processors known in the art, including, without limitation, microprocessors, microcontrollers, Application Specific Integrated Circuits ("ASICs"), or other types of commercially available hardware or firmware devices suitable for that purpose.

While embodiments and applications of this invention have been shown and described, it would be apparent to those skilled in the art having the benefit of the present disclosure that many more modifications than mentioned above are possible without departing from the inventive concepts herein. For example, without limitation, additional data such as a previous block pointer may be included in the header portion of each memory block if so desired. As another example, embodiments of the present invention may be implemented wherein only a portion of an nvram medium uses a file system according to the present invention, and another portions of the nvram medium are organized in some other fashion. The present invention, therefore, is not to be restricted except in the spirit of the appended claims.

What is claimed is:

1. A file system for a nonvolatile memory medium, comprising:
   a nonvolatile memory medium logically divided into memory blocks of predetermined size, wherein each of said memory blocks comprises a header portion and a data portion, and wherein said header portion comprises:
      a magic number indicating whether said memory block is a valid file system block;
      the name of the file to which said memory block belongs, if any;
      a set of flags indicating whether said memory block is the first or last block of said file;
      the block number of the next memory block comprising said file, if any; and
      the length of valid data in said data portion of said memory block.

2. The file system for a nonvolatile memory medium according to claim 1, wherein said header portion further comprises a flag indicating whether said file is a secure file.

3. The file system for a nonvolatile memory medium according to claim 1, wherein said header portion further comprises the block number of the previous memory block, if any.

4. The file system for a nonvolatile memory medium according to claim 1, wherein said header portion further comprises the block number of the previous memory block, if any, and a flag indicating whether said file is a secure file.

5. A nonvolatile memory medium, characterized in that it is logically divided into memory blocks of predetermined size, wherein each of said memory blocks comprises a header portion and a data portion, and wherein said header portion comprises:
   a magic number indicating whether said memory block is a valid block or a free block;
   the name of the file to which said memory block belongs;
   a flag indicating whether said memory block is the first or last block of said file;
   the block number of the next memory block comprising said file, if any; and
   the length of valid data in said data portion of said memory block.

6. The nonvolatile memory medium according to claim 5, wherein said header portion further comprises a flag indicating whether said file is a secure file.

7. The nonvolatile memory medium according to claim 5, wherein said header portion further comprises the block number of the previous memory block, if any.

8. The nonvolatile memory medium according to claim 5, wherein said header portion further comprises the block number of the previous memory block, if any, and a flag indicating whether said file is a secure file.

9. An apparatus for implementing a file system having a flat file structure, comprising:
   a processor configured to control the writing of data to and reading of data from a nonvolatile memory medium, wherein said nonvolatile memory medium is logically divided into memory blocks of predetermined size, wherein each of said memory blocks comprises a header portion and a data portion, and wherein said header portion comprises a magic number indicating whether said memory block is a valid file system block, the name of the file to which said memory block belongs, if any, a set of flags indicating whether said memory block is the first or last block of said file, the block number of the next memory block comprising said file, if any, and the length of valid data in said data portion of said memory block.

10. The apparatus according to claim 9, wherein said header portion further comprises a flag indicating whether said file is a secure file.

11. The apparatus according to claim 9, wherein said header portion further comprises the block number of the previous memory block, if any.

12. The apparatus according to claim 9, wherein said header portion further comprises the block number of the previous memory block, if any, and a flag indicating whether said file is a secure file.

* * * * *

UNITED STATES PATENT AND TRADEMARK OFFICE
CERTIFICATE OF CORRECTION

PATENT NO. : 6,606,628 B1
DATED : August 12, 2003
INVENTOR(S) : Monsen et al.

It is certified that error appears in the above-identified patent and that said Letters Patent is hereby corrected as shown below:

<u>Title page,</u>
Item [75], Inventor, replace "Mamillaplli" with -- Mamillapalli --.

<u>Column 6,</u>
Line 43, replace "d river" with -- driver --.

Signed and Sealed this

Second Day of December, 2003

JAMES E. ROGAN
*Director of the United States Patent and Trademark Office*